United States Patent
Liang et al.

(10) Patent No.: US 7,277,432 B2
(45) Date of Patent: Oct. 2, 2007

(54) ROBUST INDICATION OF MAC LEVEL ERROR CORRECTION

(75) Inventors: Jie Liang, Plano, TX (US); Matthew B. Shoemake, Allen, TX (US); Lior Ophir, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 1005 days.

(21) Appl. No.: 10/387,738

(22) Filed: Mar. 13, 2003

(65) Prior Publication Data

US 2003/0231658 A1 Dec. 18, 2003

Related U.S. Application Data

(60) Provisional application No. 60/364,324, filed on Mar. 14, 2002.

(51) Int. Cl.
*H04L 12/56* (2006.01)
*H03M 13/00* (2006.01)

(52) U.S. Cl. .................. 370/389; 370/469; 714/752
(58) Field of Classification Search .............. None
See application file for complete search history.

(56) References Cited

U.S. PATENT DOCUMENTS

| | | | | |
|---|---|---|---|---|
| 6,005,853 A * | 12/1999 | Wang et al. | ............... | 370/332 |
| 7,089,478 B2 * | 8/2006 | Cummings et al. | ......... | 714/755 |
| 7,120,123 B1 * | 10/2006 | Quigley et al. | ............. | 370/252 |
| 2002/0053062 A1 * | 5/2002 | Szymanski | ................... | 714/801 |
| 2003/0061562 A1 * | 3/2003 | Ishiwatari et al. | .......... | 714/777 |
| 2003/0066008 A1 * | 4/2003 | Kikuchi et al. | ............. | 714/752 |
| 2003/0135797 A1 * | 7/2003 | Choi | .......................... | 714/704 |

\* cited by examiner

*Primary Examiner*—Wing Chan
*Assistant Examiner*—Gregory B. Sefcheck
(74) *Attorney, Agent, or Firm*—Steven A. Shaw; W. James Brady; Frederick J. Telecky, Jr.

(57) ABSTRACT

In digital communications that utilize a data packet format wherein each data packet includes a physical layer (PHY) component and a media access control layer (MAC) component, the media access control layer component can be selectively protected by forward error correction (FEC). The receiving end receives an indication as to whether FEC has been applied, and makes an FEC decision based (12-15) on this indication. The accuracy of the received-side FEC decision and the robustness of the FEC indication can be improved by: making the FEC decision based on the results of FEC decoding applied to a media access control layer header within the media access control layer component; providing an FEC indication bit in the physical layer component; and using a plurality of bits to encode the FEC indication in either the physical layer component or the media access control layer component.

4 Claims, 4 Drawing Sheets

| OCTETS: 2 | 2 | 6 | 6 | 6 | 2 | 6 | 2 | 0-2312 | 4 |
|---|---|---|---|---|---|---|---|---|---|
| FRAME CONTROL | DURATION/ID | ADDRESS 1 | ADDRESS 2 | ADDRESS 3 | SEQUENCE CONTROL | ADDRESS 4 | QoS CONTROL | FRAME BODY | FCS |

BIT 0 ⌐15
FEC0 ⌐   MAC HEADER   FEC1 ⌐9

ROBUST INDICATION OF MAC LEVEL ERROR CORRECTION

This application claims the priority under 35 U.S.C. § 119(e)(1) of copending U.S. provisional application No. 60/364,324 filed on Mar. 14, 2002, and incorporated herein by reference.

FIELD OF THE INVENTION

The invention relates generally to digital communications and, more particularly, to the application of error correction in digital communications.

BACKGROUND OF THE INVENTION

Forward error correction (also referred to herein as FEC or error correction) has been incorporated into many digital communication systems. For example, FEC is specified in the IEEE 802.11e draft. In conventional practice, the Media Access Control (MAC) layer can selectively apply FEC to the Physical Layer Service Data Unit (PSDU). The PSDU includes the MAC header and the MAC payload. FIG. 1 diagrammatically illustrates pertinent portions of a conventional 802.11 communication apparatus that includes FEC capability. In the example of FIG. 1, a selector 13 in the MAC layer has an input 14 which receives the data stream 11 that passes from the physical (PHY) layer to the MAC layer. For each PSDU in the data stream 11, the selector 13 determines whether to send the PSDU to a data path 17 for regular MAC processing or to a data path 19 for MAC processing with FEC.

The decision of the selector 13 is determined by its control input 12, which is driven by the output of an FEC decision decoder 15. The FEC decision decoder 15 determines whether to use regular MAC processing or FEC MAC processing based on the value of a predetermined bit in the MAC header. Such use of a single bit to control the selection decision at 13 limits the accuracy of the decision at 13 to the bit error rate (BER) of the system, for example, a BER of $10^{-4}$ for IEEE 802.11 systems. Even if FEC has been applied to a given packet, the FEC decision decoder 15 cannot take advantage of the improved BER provided by the FEC, and the accuracy of the decision at 13 remains limited to the nominal BER of the system, for example, the aforementioned BER of $10^{-4}$ associated with IEEE 802.11 systems.

It is therefore desirable to improve the accuracy of MAC-level FEC decisions such as illustrated generally at 12-15 in FIG. 1, and to provide a more robust indication of the use (or non-use) of FEC.

Various embodiments of the invention improve the accuracy of the receive-side FEC decision and the robustness of the FEC indication by: making the FEC decision based on the results of FEC decoding applied to the MAC header; providing an FEC indication bit in the PHY component of the packet; and using a plurality of bits to encode the FEC indication in either the PHY component of the packet or the MAC component of the packet.

DETAILED DESCRIPTION

Figure 1:
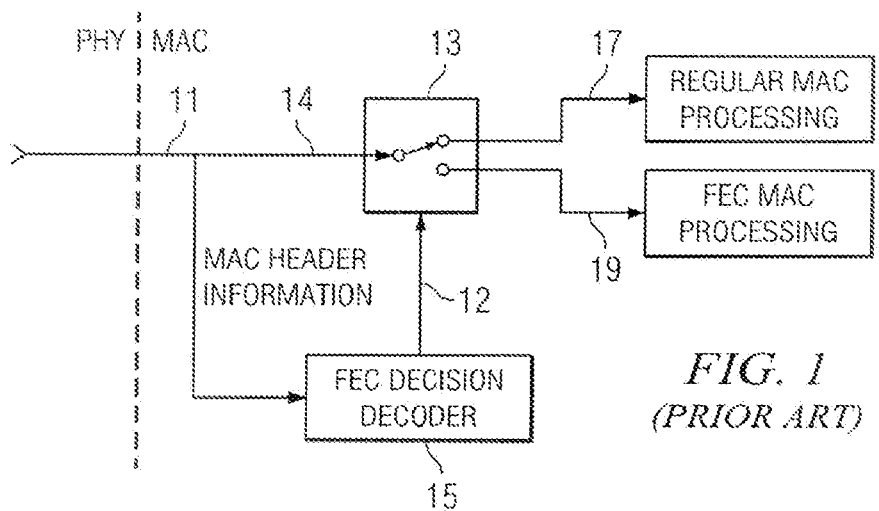
FIG. 1 diagrammatically illustrates an example of an FEC decision-making arrangement in a conventional digital communication apparatus.
Figure 2:
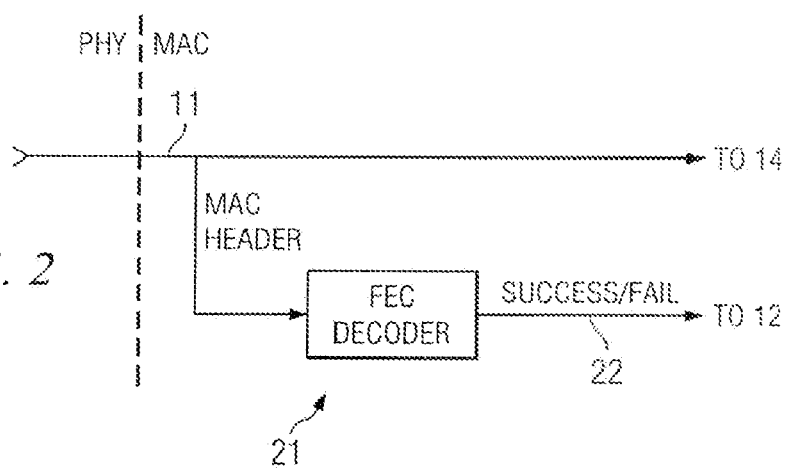
FIG. 2 diagrammatically illustrates exemplary embodiments of an FEC decision-making apparatus according to the invention.

FIG. 2 diagrammatically illustrates exemplary embodiments of an FEC decision-making apparatus according to the invention. In the apparatus of FIG. 2, the FEC decision decoder 21 is itself an FEC decoder, for example, a Reed-Solomon decoder. The FEC decoder applies FEC decoding to the MAC header. If the FEC decoding process results in a successful decoding of the MAC header, then a corresponding indication of success at 22 causes the selector (for example the selector 13 of FIG. 1) to select the FEC (e.g., Reed-Solomon) processing path (see 19 in FIG. 1). On the other hand, if the FEC decoder fails to successfully decode the MAC header, then the corresponding failure indication at 22 will cause the selector to select the regular processing path (see 17 in FIG. 1).

Figure 3:
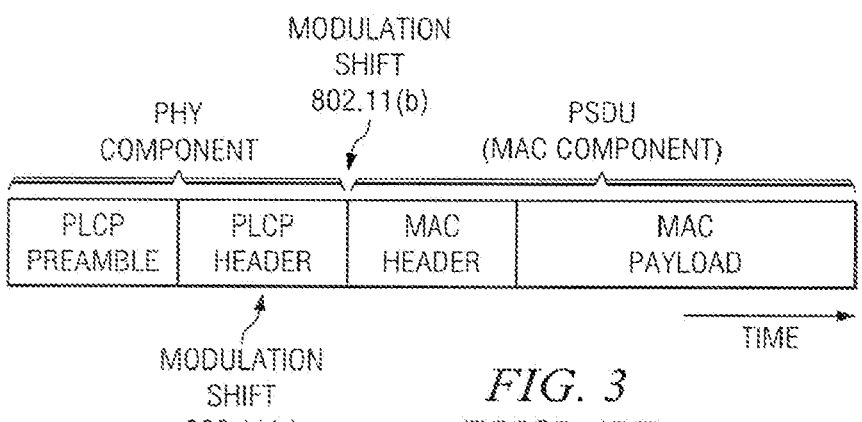
FIG. 3 illustrates conventional packet structures according to IEEE 802.11.

FIG. 3 illustrates the general format of data packets used in conventional IEEE 802.11 systems. As shown in FIG. 3, the packet has a PHY component including a PLCP (Physical Layer Convergence Protocol) preamble and a PLCP header (also referred to as the PHY header), and a MAC component including the MAC header and the MAC payload. The MAC component is also referred to as the Physical Layer Service Data Unit (PSDU). In IEEE 802.11b systems, a modulation shift occurs at the time boundary between the PHY header and the MAC header. In IEEE 802.11a systems, a modulation shift occurs within the PHY header, specifically at the time boundary between the signal field and the service field. In both 802.11a and 802.11b systems, data bits that are transmitted before the modulation shift can be recovered at the receiving end with greater reliability than can data bits that are transmitted after the modulation shift.

Figure 4:
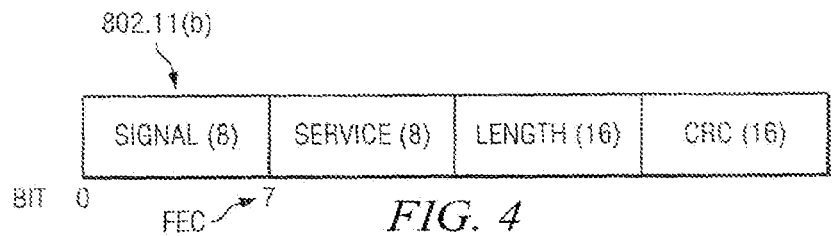
FIG. 4 illustrates an example of an FEC indication bit in the signal field of the PHY header of an IEEE 802.11b packet according to the invention.
Figure 5:
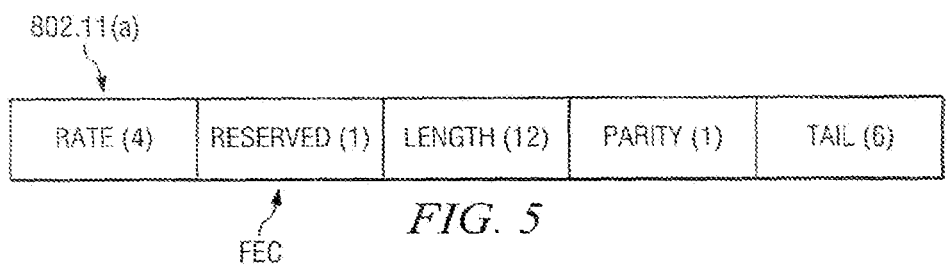
FIG. 5 illustrates an FEC bit in the signal field of the PHY header of an IEEE 802.11a packet according to the invention.
Figure 6:
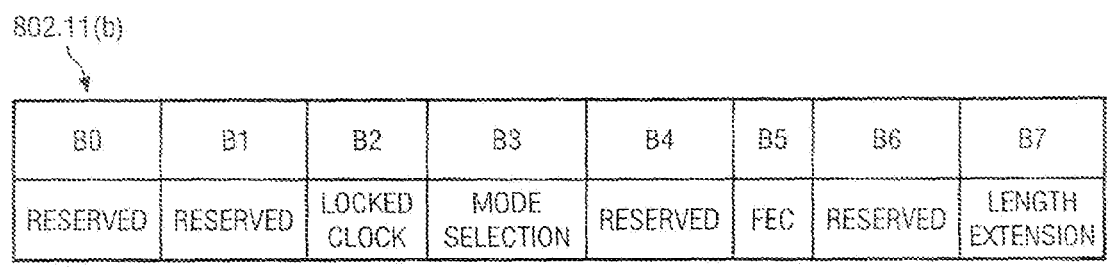
FIG. 6 illustrates an FEC indication bit in the service field of the PHY header of an IEEE 802.11b packet according to the invention.

Accordingly, the present invention recognizes that the robustness of the transmitted FEC indication can be improved by transmitting the FEC indication before the modulation shift. For example, for an 802.11b apparatus, available bit 7 of the signal field of the PHY header can be used to provide the FEC indication, as shown in FIG. 4. As an example for an 802.11a apparatus, the reserved bit between the Rate and Length sub-fields of the signal field of the PHY header can be used for the FEC indication bit, as shown in FIG. 5. FIG. 6 shows another example for 802.11b systems, wherein reserved bit 5 (B5) of the service field of the PHY header is used for the FEC indication bit.

Figure 7:
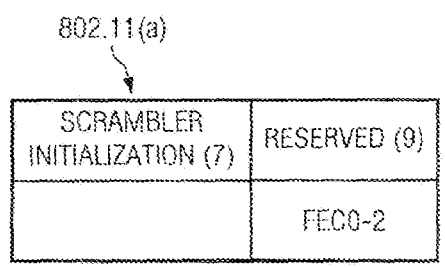
FIG. 7 illustrates the use of an encoded plurality of bits to provide the FEC indication in the service field of the PHY header of an IEEE 802.11a packet according to the invention.

Other exemplary embodiments of the present invention increase the robustness of the FEC indication by using a plurality of bits to encode the FEC indication. FIG. 7 illustrates an example of this technique for an 802.11a apparatus. As shown in FIG. 7, a plurality of reserved bits in the service field of the PHY header can be used to encode the FEC indication. As one specific example, 3 bits can be used to encode the FEC indication according to a repetition code, and the FEC decision decoder at the receiver can use a majority vote of the 3 bits to decide whether or not FEC applies. Although the 802.11a service field of FIG. 7 is transmitted after the aforementioned modulation shift, nevertheless the availability of multiple service field bits to encode the FEC indication permits an improvement in the robustness of the FEC indication.

Figure 8:
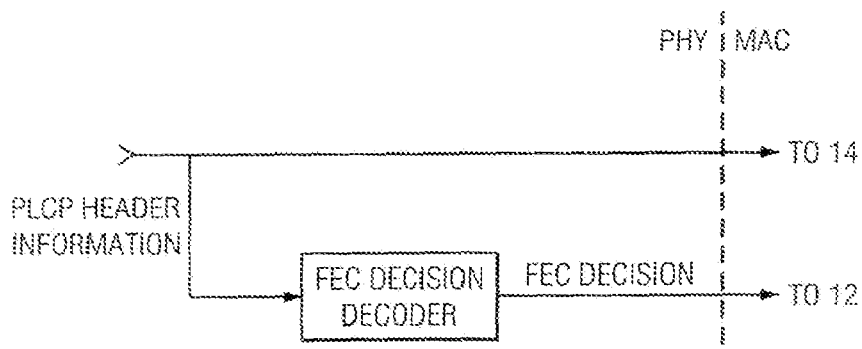
FIG. 8 diagrammatically illustrates exemplary embodiments of an FEC decision-making apparatus which can decode FEC indication bits in the PHY header according to the invention.

FIG. 8 diagrammatically illustrates exemplary embodiments of an FEC decision-making apparatus according to the invention. In various embodiments, the different codings of the FEC indication illustrated in FIGS. 4, 5, 6 and 7 can be appropriately decoded by the FEC decision decoder of FIG. 8. Thus, in the examples given, the FEC decision decoder of FIG. 8 analyzes the PHY (PLCP) header and makes the FEC decision in the PHY layer. This FEC decision is then passed to the MAC layer to control the selection of regular or FEC processing (see also 13, 17 and 19 of FIG. 1). The FEC decision decoder of FIG. 8 can, in various exemplary embodiments: inspect bit 7 of the signal field of the 802.11b PHY header (see also FIG. 4); inspect the bit between the Rate and Length sub-fields of the signal field of the 802.11a PHY header (see also FIG. 5); inspect bit 5 of the service field of the 802.11 b PHY header (see also FIG. 6); and decode a plurality of bits which follow the scrambler initialization sub-field in the service field of the 802.11a PHY header (see also FIG. 6).

Figure 9:
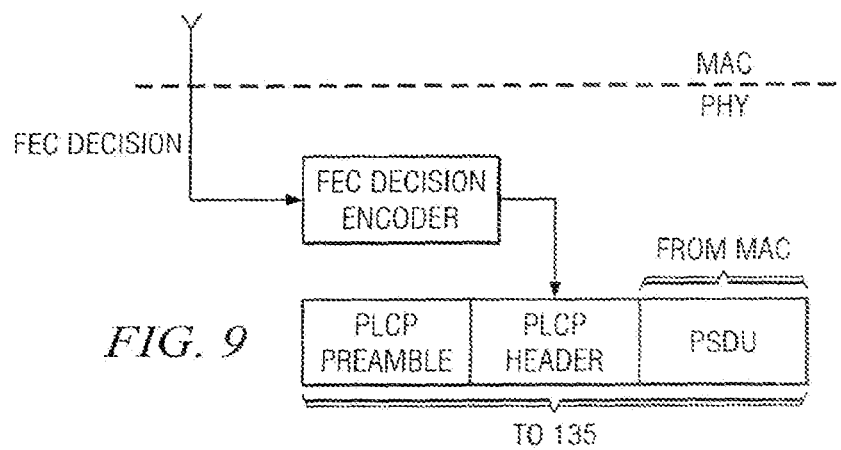
FIG. 9 diagrammatically illustrates exemplary embodiments of a transmit-side apparatus for encoding an FEC indication into the PHY header according to the invention.

FIG. 9 diagrammatically illustrates exemplary embodiments of a transmit-side apparatus for encoding the FEC indication into the PHY (PLCP) header. In various exemplary embodiments, the FEC decision encoder of FIG. 9 can encode the FEC decision (as received from the MAC layer) to produce an encoded FEC indication in the PHY header in accordance with any of FIGS. 4-7. In some embodiments, the FEC decision encoder simply routes an FEC decision bit received from the MAC layer directly to a selected location in the PHY header.

Figures 10, 12, 13:
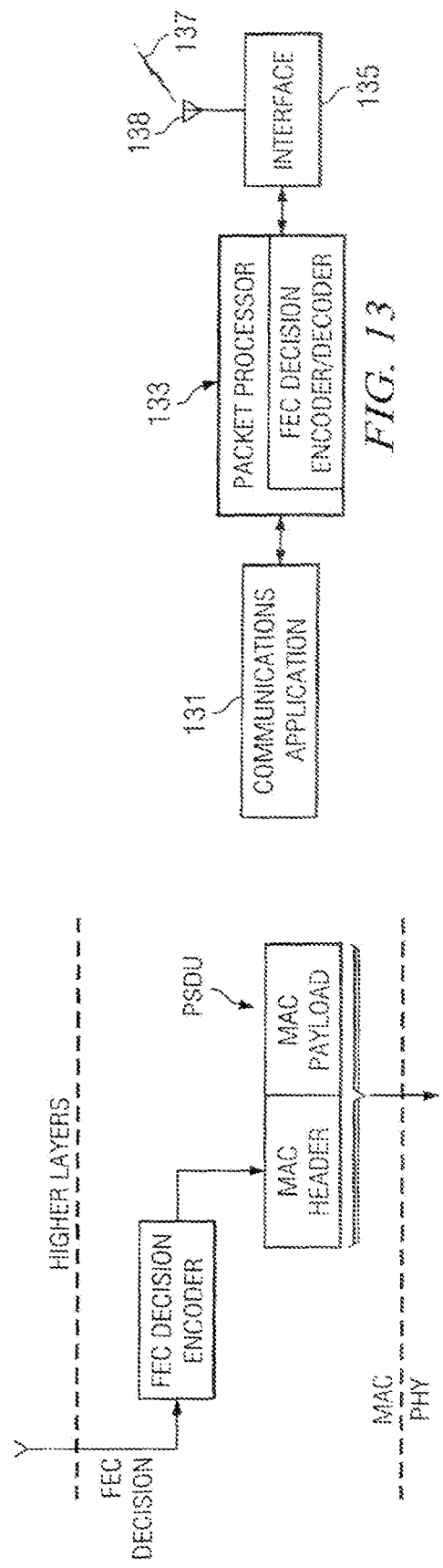
FIG. 10 illustrates the use of an encoded plurality of bits to provide the FEC indication in the MAC header of an IEEE 802.11 packet according to the invention.
FIG. 12 diagrammatically illustrates exemplary embodiments of a transmit-side apparatus according to the invention for encoding into the MAC header FEC indication bits such as illustrated in FIG. 10.
FIG. 13 diagrammatically illustrates pertinent portions of exemplary embodiments of a digital communication apparatus according to the invention.

FIG. 10 illustrates another example of using a plurality of bits to encode the FEC indication for IEEE 802.11 systems. In the example of FIG. 10, bit 15 of the Frame Control field of the MAC header and bit 9 of the QoS Control field of the MAC header are used to encode the FEC indication. For example, FEC processing could be indicated when both bits are one, and regular MAC processing could be indicated when both bits are zero. Also in the example of FIG. 10, the two FEC indication bits are timewise separated from one another by more than 200 bits within the 256-bit-wide MAC header. Such a separation between the FEC indication bits provides additional robustness with respect to burst errors.

Figure 11:
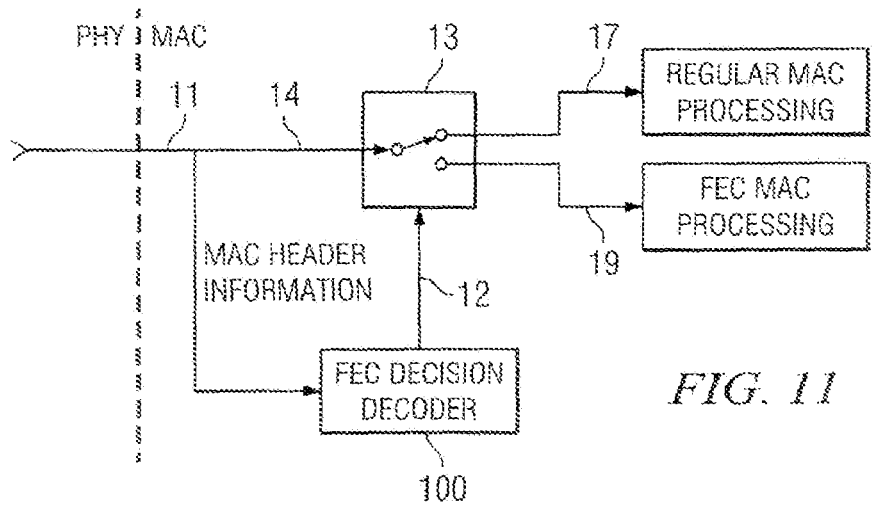
FIG. 11 diagrammatically illustrates exemplary embodiments of an FEC decision-making apparatus which can decode the multi-bit FEC indication in the MAC header of FIG. 10 according to the invention.

FIG. 11 diagrammatically illustrates further exemplary embodiments of an FEC decision-making apparatus according to the invention. In some embodiments, the FEC decision decoder 100 is capable of decoding in the MAC layer the coded FEC indication illustrated in the MAC header of FIG. 10. The result of this decoding operation controls the selector 13.

FIG. 12 diagrammatically illustrates exemplary embodiments of a transmit-side apparatus capable of encoding the FEC indication into the MAC header. In some embodiments, the FEC decision encoder can encode the FEC decision (received from a higher layer) to produce an encoded FEC indication in the MAC header in the manner described above with respect to FIG. 10.

Although the multi-bit coding examples shown in FIGS. 7 and 10 use 3 and 2 bits, respectively, other embodiments use more than 3 bits for coding the FEC indication. As used herein, coding (and coder) can refer to encoding operations (and corresponding encoders), such as those described herein, and also to decoding operations (and corresponding decoders), such as those described herein. Also, although specific examples of coding schemes have been described above with respect to FIGS. 7 and 10, different coding schemes, for example, Hamming codes, can be utilized in other embodiments.

In some embodiments, FEC encoding and decoding of the MAC component is performed by the PHY layer instead of the MAC layer.

FIG. 13 diagrammatically illustrates pertinent portions of exemplary embodiments of a digital communication transmitter, receiver or transceiver apparatus according to the invention. In FIG. 13, a user's communications application 131 is coupled to a packet processor 133 for permitting transfer of communication information therebetween. For transmission operations, the packet processor 133 formats the communication data into packets (for example, 802.11a or 802.11b packets), and forwards the packets to a communication interface 135. The communication interface 135 can use conventional techniques to interface the packets received from the packet processor 133 with a communications medium. In the example of FIG. 13, the communications medium is a wireless communications link 137, with which the interface 135 communicates via an antenna 138. In reception operations, the process is generally reversed, such that the communications interface 135 uses conventional techniques to interface the communications medium 137 to the packet processor 133. The packet processor 133 receives packets from the communications interface 135 and, in response to the received packets, produces corresponding communication information for the communications application 131.

As shown in FIG. 13, the packet processor can include an FEC decision encoder, an FEC decision decoder, or both, depending upon whether the apparatus is a transmitter, a receiver or a transceiver, respectively. In various exemplary embodiments, the FEC decision encoders and decoders can correspond to those described above with respect to FIGS. 2 and 4-12. Other than the FEC decision encoders and decoders, the packet processor 133 can utilize conventional techniques to construct packets in response to the communication information received from communications application 131, and can also use conventional techniques to deconstruct the packets received from communication interface 135 to produce corresponding communication information for the communication application 131.

Although exemplary embodiments of the invention are described above in detail, this does not limit the scope of the invention, which can be practiced in a variety of embodiments.

What is claimed is:

1. A digital communication apparatus that utilizes a data packet format wherein each data packet includes a physical layer component and a media access control layer component, comprising:
    a physical layer portion for processing the physical layer component; and
    a media access control layer portion coupled to said physical layer portion for processing the media access control layer component, said media access control layer portion comprising:
        an input for receiving digital information indicative of whether the media access control layer component has been selected to be protected by an error correction code; and
        an encoder coupled to said input for applying to said digital information an encoding operation for encoding said digital information into a plurality of bits in a media access control layer header within the media access control layer component, wherein two of said bits are separated from one another within the media access control layer header by more than a majority of a bit width of the media access control layer header.

2. A digital communication apparatus that utilizes a data packet format wherein each data packet includes a physical layer component and a media access control layer component, comprising:
    a physical layer portion for processing the physical layer component; and
    a media access control layer portion coupled to said physical layer portion for processing the media access control layer component, said media access control layer portion comprising:
        an input for receiving digital information carried in the media access control layer component and indicative of whether the media access control layer component has been selected to be protected by an error correction code; and
        a decoder coupled to said input for applying to said digital information a decoding operation,
            wherein said digital information includes a plurality of bits in a media access control layer header within the media access control layer component, and wherein two of said bits are separated from one another within the media access control layer header by more than a majority of a bit width of the media access control layer header.

3. A method of digital data communication, comprising:
    transferring digital data via data packets that each include a physical layer component and a media access control layer component, and
    for each said data packet, using a plurality of bits in the media access control layer component to provide an indication of whether the media access control layer component has been selected to be protected by an error correction code, said using further comprising:
        decoding said plurality of bits to obtain said indication; and providing said plurality of bits in a media access control layer header of the media access control layer component, wherein two of said bits are separated from one another within the media access control layer header by more than a majority of a bit width of the media access control layer header.

4. A method of digital data communication, comprising:
    transferring digital data via data packets that each include a physical layer component and a media access control layer component, and
    for each said data packet, using a plurality of bits in the media access control layer component to provide an indication of whether the media access control layer component has been selected to be protected by an error correction code, said using further comprising:
encoding said indication into said plurality of bits in a media access control layer header of the media access control layer component, wherein two of said bits are separated from one another within the media access control layer header by more than a majority of a bit width of the media access control layer header.

* * * * *